Jan. 8, 1924.
G. W. STEELE
1,480,476
SELF AND EVER SET TRAP
Filed May 12, 1923
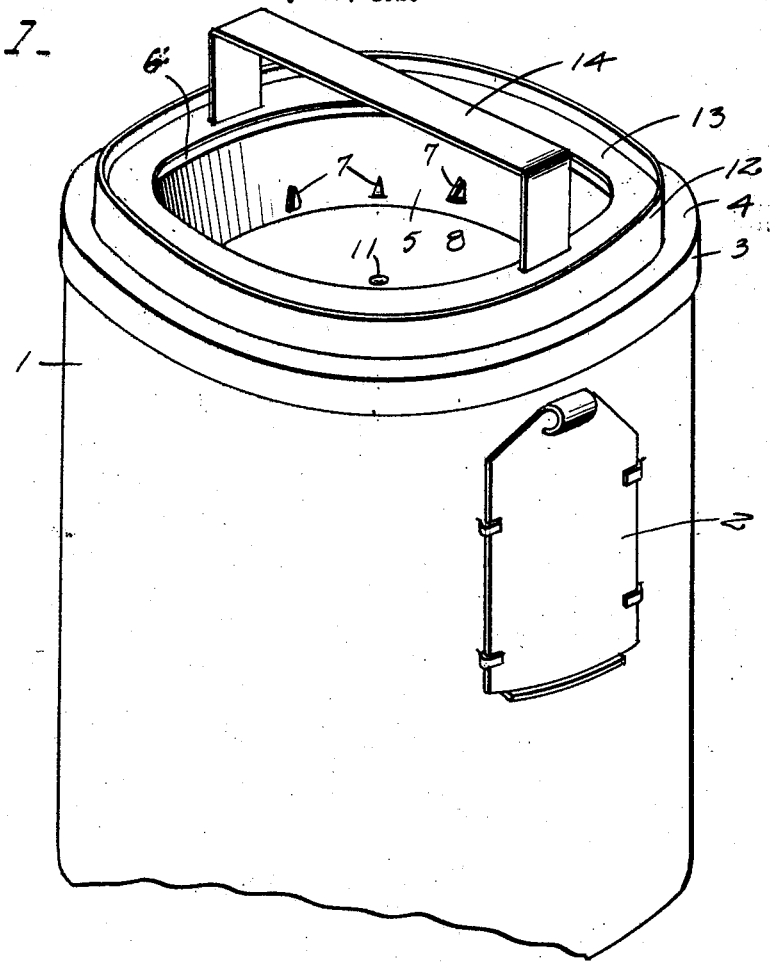
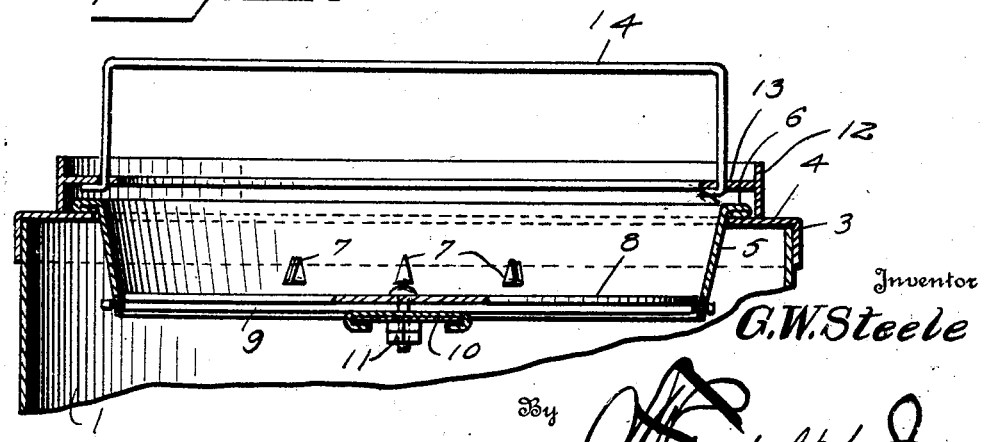
Inventor
G. W. Steele Patented Jan. 8, 1924.

1,480,476

UNITED STATES PATENT OFFICE.

GEORGE WESLEY STEELE, OF DOUBLE SPRINGS, ALABAMA, ASSIGNOR OF ONE-HALF TO JOHN C. STEELE, OF DOUBLE SPRINGS, ALABAMA.

SELF AND EVER SET TRAP.

Application filed May 12, 1923. Serial No. 638,556.

*To all whom it may concern:*

Be it known that I, GEORGE WESLEY STEELE, citizen of the United States, residing at Double Springs, in the county of Winston and State of Alabama, have invented certain new and useful Improvements in Self and Ever Set Traps; and I do hereby declare the following to be a full, clear, and exact description of the invention, such as will enable others skilled in the art to which it appertains to make and use the same.

The invention has relation to traps for catching rats and has for its object to provide a trap which is automatic in action after being baited and primed, the rat when trapped being drowned and the trap automatically resetting itself to catch the next rat seeking to obtain the bait.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a trap embodying the invention, and

Figure 2 is a vertical central section of the upper portion of the trap showing the parts on a larger scale.

Corresponding and like parts are referred to in the following description and designated in both views of the drawings by like reference characters.

The numeral 1 designates the body of the trap which may consist of a vessel such as a can, which is provided in a side near the top with an opening to which is fitted a sliding door 2. A rim 3 is fitted to the top of the vessel 1 and comprises an inwardly extending flange 4 from which is suspended a collar 5 of tapering form and having an outer flange 6 overlapping the inner flange 4. Spurs 7 are pressed outwardly from the sides of the collar 5 and are disposed about the lower edge thereof and are adapted to receive the bait. A trap door 8 is pivotally mounted in the lower portion of the collar 5 and is so balanced as to normally occupy a horizontal position. A shaft 9 is clamped to the underside of the trap door 8 and passes through openings formed in opposite sides of the collar 5. The shaft 9 is clamped between the trap door 8 and a plate 10, the latter being secured in the adjusted position by means of bolts 11. A rim 12 is supported upon the inner flange 4 of the rim 3 and embraces the outer flange 6 of the collar 5. The rim 12 has an inner flange 13 which provides a ledge from which the rat is adapted to plunge in order to obtain the bait thereby landing upon the trap door 8 which tilts and discharges the rat into the vessel 1. A cross piece 14 overhangs the trap and its ends are bent downwardly and secured to the inner flange or ledge 13 of the rim 12. This crosspiece provides a handle as well as a support from which the rats may plunge in an attempt to obtain the bait.

While it is preferred to form the different parts separately, however, it is to be understood that any two or more may be formed together or connected in any preferred way to operate as one part. The vessel 1 is supplied with a quantity of water sufficient to drown the rats, the latter being thus disposed of as soon as entraped, thereby preventing any possible escape and subsequent annoyance.

What is claimed is:

A self-set trap comprising a vessel, a rim fitted to the top of the vessel and having a flange engaging the outer side of the vessel at the upper edge thereof and having an inner flange projecting inwardly of the vessel, a tapering collar having an outer flange overlapping the inner flange of said rim and suspending the collar in the upper portion of the vessel in spaced relation from the sides thereof and with its smaller portion disposed lowermost, a trap door pivotally mounted in the lower portion of the collar and within the vessel, the pivotal mounting of the trap door comprising a shaft having its ends journaled in opposite sides of the collar and means clamping the trap door to the shaft, a second rim embracing the outer flange of the collar and resting upon the inner flange of the first mentioned rim, and said second rim having an inwardly disposed flange to form a ledge and a crosspiece mounted upon the inner flange of the second rim, and disposed over and spaced above said trap door.

In testimony whereof I affix my signature in presence of two witnesses.

GEORGE WESLEY STEELE.

Witnesses:
F. O. BURDICK,
M. J. GILBREATH.